(12) United States Patent
Yamada et al.

(10) Patent No.: US 9,477,515 B2
(45) Date of Patent: *Oct. 25, 2016

(54) HANDLING OPERATING SYSTEM (OS) TRANSITIONS IN AN UNBOUNDED TRANSACTIONAL MEMORY (UTM) MODE

(71) Applicant: Intel Corporation, Santa Clara, CA (US)

(72) Inventors: Koichi Yamada, Los Gatos, CA (US); Landy Wang, Kirkland, WA (US); Martin Taillefer, Redmond, WA (US); Arun Kishan, Bellevue, WA (US); David Callahan, Seattle, WA (US); Jan Gray, Bellevue, WA (US); Gad Sheaffer, Haifa (IL); Ali-Reza Adl-Tabatabai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 677 days.

This patent is subject to a terminal disclaimer.

(21) Appl. No.: 13/956,495

(22) Filed: Aug. 1, 2013

(65) Prior Publication Data

US 2015/0039869 A1 Feb. 5, 2015
US 2016/0216973 A9 Jul. 28, 2016

Related U.S. Application Data

(63) Continuation of application No. 12/638,064, filed on Dec. 15, 2009, now Pat. No. 8,521,995.

(51) Int. Cl.
*G06F 9/46* (2006.01)
*G06F 9/30* (2006.01)
*G06F 9/38* (2006.01)

(52) U.S. Cl.
CPC ........... *G06F 9/467* (2013.01); *G06F 9/30076* (2013.01); *G06F 9/3834* (2013.01); *G06F 9/3836* (2013.01); *G06F 9/3857* (2013.01)

(58) Field of Classification Search
None
See application file for complete search history.

(56) References Cited

U.S. PATENT DOCUMENTS 6,243,778 B1 6/2001 Fung et al.
6,571,332 B1 5/2003 Miranda et al.
(Continued)

FOREIGN PATENT DOCUMENTS

CN 101322103 A 12/2008
EP 0871115 A2 10/1998
WO WO 2010/151267 A1 12/2010

OTHER PUBLICATIONS

Chuang, W. etal., Unbounded Page-Based Transactional Memory, 2006, ACM, pp. 347-358.*

(Continued)

*Primary Examiner* — Eric Coleman
(74) *Attorney, Agent, or Firm* — Trop, Pruner & Hu, P.C.

(57) ABSTRACT

In one embodiment, the present invention includes a method for receiving control in a kernel mode via a ring transition from a user thread during execution of an unbounded transactional memory (UTM) transaction, updating a state of a transaction status register (TSR) associated with the user thread and storing the TSR with a context of the user thread, and later restoring the context during a transition from the kernel mode to the user thread. In this way, the UTM transaction may continue on resumption of the user thread. Other embodiments are described and claimed.

17 Claims, 8 Drawing Sheets

(56) References Cited

U.S. PATENT DOCUMENTS

| | | |
|---|---|---|
| 6,640,285 B1 | 10/2003 | Boparkikar et al. |
| 6,978,396 B2 | 12/2005 | Ruuth et al. |
| 7,127,561 B2 | 10/2006 | Hill et al. |
| 7,313,764 B1 | 12/2007 | Brunner et al. |
| 7,395,382 B1 | 7/2008 | Moir |
| 7,502,897 B2 | 3/2009 | Hertzberg et al. |
| 7,542,977 B2 | 6/2009 | Hudson et al. |
| 7,836,450 B2 | 11/2010 | Kissell |
| 2002/0108025 A1 | 8/2002 | Shaylor |
| 2004/0260972 A1 | 12/2004 | Ji et al. |
| 2005/0086446 A1 | 4/2005 | McKenney et al. |
| 2007/0143287 A1 | 6/2007 | Adl-tabatabai et al. |
| 2007/0143741 A1 | 6/2007 | Harris |
| 2007/0156780 A1 | 7/2007 | Saha et al. |
| 2007/0156994 A1 | 7/2007 | Akkary et al. |
| 2007/0162520 A1 | 7/2007 | Peterson et al. |
| 2007/0186056 A1 | 8/2007 | Saha et al. |
| 2007/0239943 A1 | 10/2007 | Dice et al. |
| 2007/0260942 A1 | 11/2007 | Rajwar et al. |
| 2008/0010532 A1 | 1/2008 | Lev et al. |
| 2008/0162881 A1 | 7/2008 | Welc et al. |
| 2008/0162885 A1 | 7/2008 | Wang et al. |
| 2008/0162886 A1 | 7/2008 | Saha et al. |
| 2008/0162990 A1 | 7/2008 | Wang et al. |
| 2008/0256073 A1 | 10/2008 | Detlefs et al. |
| 2008/0270745 A1 | 10/2008 | Saha et al. |
| 2009/0006767 A1 | 1/2009 | Saha et al. |
| 2009/0144524 A1 | 6/2009 | Shen et al. |
| 2009/0172306 A1 | 7/2009 | Nussbaum et al. |
| 2010/0088702 A1 | 4/2010 | Dern et al. |

OTHER PUBLICATIONS

"Software Assisted Transact Cache to Support Efficient Unbounded Transactional Memory", Shaogang Wang et.al., The 10th IEEE International Conference on High Performance Computing and Communications, pp. 77-84, Sep. 27, 2008.
"A Ring-Based Decentralized Collaborative Non-Blocking Atomic Commit Protocol", Chun-yao Want et al., 2008 IEEE/WIC/ACM International Conference on Web Intelligence and Intelligent Agent Technology, pp. 395-398, Dec. 12, 2008.
Chinese Patent Office, Office Action mailed Dec. 16, 2014, In Chinese Patent Application No. 201080064002.7.
Patent Cooperation Treaty, Notification of Transmittal of the International Search Report and the Written Opinion of the International Searching Authority mailed Jun. 24, 2011 in international application No. PCT/US2010/056142.
Patent Cooperation Treaty, Notification of Transmittal of the International Search Report and the Written Opinion of the International Searching Authority mailed Jul. 21, 2011 in international application No. PCT/US2010/056172.
Patent Cooperation Treaty, Notification of Transmittal of the International Search Report and the Written Opinion of the International Searching Authority mailed Jun. 23, 2011 in international application No. PCT/US2010/054219.
C. Scott Ananian, et al., "Unbounded Transactional Memory," 2005, pp. 316-327.
Arrvindh Shriraman, et al., "Hardware Acceleration of Software Transactional Memory," May 18, 2006, pp. 1-10.
Sanjeev Kumar, et al., "Hybrid Transactional Memory," Mar. 29-31, 2006, pp. 1-28.
Bratin Saha, et al., "Architectural Support for Software Transactional Memory," Dec. 9-13, 2006, pp. 1-12.
Peter Damron, et al., "Hybrid Transactional Memory," Oct. 21-25, 2006, pp. 1-11.
U.S. Appl. No. 12/638,054, filed Dec. 15, 2009, entitled "Mechanisms to Accelerate Transactions Using Buffered Stores," by Ali-Reza Adl-Tabatabai, et al.
U.S. Appl. No. 12/638,181, filed Dec. 15, 2009, entitled "Performing Mode Switching in an Unbounded Transactional Memory (UTM) System," by Jan Gray, et al.
State Intellectual Property Office, P.R. China, First Office Action issued Mar. 1, 2010, in Chinese application serial No. 200680046532,2.
Moir, M., "Hybrid Transactional Memory," Announcement Sun Microsystems, Jul. 2005, pp. 1-15.
Stonebraker, M., "Virtual Memory Transaction Management," Operating Systems Review USA, vol. 18, No. 2, Apr. 1984, pp. 8-16.
Chang, A., et al., "801 Storage: Architecture and Programming," ACM Transactions on Computer Systems, ACM, New York NY, US, vol. 6, No. 1.1, Feb. 1988, pp. 28-50.
Lev Y., et al., "Towards a Safer Interaction with Transactional Memory by Tracking Object Visibility," Proceedings of Synchronization and Concurrency in Object-Oriented Languages (SCOOL), OOPSLA 2005 Workshop, Oct. 7, 2005, pp. 31-38.
Lie, S., "Hardware Support for Unbounded Transactional Memory," Master's Thesis, MIT Department of Electrical Engineering and Computer Science, May 7, 2004, pp. 1, 3, 7, 8, 85-102.
International Preliminary Report on Patentability (IPRP), Jun. 26, 2008, for International Application No. PCT/US2006/046499, 7 pages.
Moir M., "Hybrid Hardware/Software Transactional Memory," Sun Microsystems, Apr. 8, 2005, 21 pages.
PCT International Search Report and Written Opinion, Jun. 12, 2007 for International Application No. PCT/US2006/046499, 11 pages.
Sukha, J., "Memory-Mapped Transactions," Master's Thesis, MIT Department of Electrical Engineering and Computer Science, Jun. 2005, 92 pages.
Ennals, R., "Software Transactional Memory Should Not Be Obstruction-Free," Sep. 14, 2005.
Harris, T., et al., "Language Support for Lightweight Transactions," Proceedings of the 18th Annual ACM SIGPLAN Conference on Object-oriented Programming, Systems, Languages, and Applications, Oct. 2003, pp. 388-402.
Herlihy, M, et al., "Transaction Memory; Architectural Support for Lock-Free Data Structures," Proceedings of the 20th Annual International Symposium on Computer Architecture, 1993, pp. 289-300.
Hewlett-Packard Development Company, "Memory-Relevant Portions of the Processor," Sep. 18, 2005.
Lie, S., et al., "An Integrated Hardware-Software Approach to Transactional Memory," MIT Computer Science and Artificial Intelligence Laboratory, Feb. 2004, pp. 1-2.
Lie, S., "An Integrated Hardware-Software Approach to Transactional Memory." 6.895 Theory of Parallel Systems, Paper, pp. 1-18.
Lie, S., "An Integrated Hardware-Software Approach to Transactional Memory," 6.895 Theory of Parallel Systems, Presentation, Dec. 8, 2003.
Rajwar, R., et al., "Virtualizing Transactional Memory," ACM SIGARCH Computer Architecture News, vol. 33, Issue 2, May 2005, pp. 494-505.
Stenstrom, P., "A Survey of Cache Coherence Schemes for Multi-processors," Computer, vol. 23, Issue 6, Jun. 1990, pp. 12-24.
Dave Dice, et al, "Transactional Locking II," 2006, pp. 1-15.
Shaogang Wang, et al, "Software Assisted Transact Cache to Support Efficient Unbounded Transactional Memory," Sep. 2008, IEEE Int'l Conference on High Performance Computing and Communications, pp. 77-84.
Chun Yao Wang, et al., "Ring Based Decentralized Collaborative Non-Blocking Atomic Commit Protocol," 2008, IEEE 2008 WIC/ACM Int'l Conference on Web Intelligence and Intelligent Agent Technology, pp. 395-398.
Korean Intellectual Property Office, Office Action mailed Jul. 24, 2013 in Korean application No. 10-2012-7018479.
Yen, et al.: "LogTM-SE: Decoupling Hardware Transactional Memory from Caches", High Performance Computer Architecture, 2007, HPCA 2007, IEEE 13th International Symposium On, IEEE, PI, Feb. 1, 2007, pp. 261-272, XP031072914, ISBN: 978-1-4244-0804-7 * abstract* *p. 262, left-hand column, line 16—line 40* *p. 262, right-hand column, line 3—line 37* * p. 263, right-hand column, line 18—line 37* * p. 264, left-hand column, line 5—line 13* * p. 265*.

(56) References Cited

OTHER PUBLICATIONS

Bobba, et al.: "Token I M: Efficient Execution of Large Transactions with Hardware Transactional Memory", Computer Architecture, 2008, ISCA '08, 35th International Symposium On, IEEE, Piscataway, NJ, USA, Jun. 21, 2008, pp. 127-138, XP031281673, ISBN: 978-0-7695-3174-8 * abstract* * p. 128, left-hand column* * Section 3.2; p. 129, right-hand column, p. 130, left-hand column, line 2* *p. 130, left-hand column, line 19—last line; figure 2* *p. 132, right-hand column, line 7—line 13* *p. 133, right-hand column, line 6—line 7* *p. 133, right-hand column, line 23—25* *p. 134, left-hand column, line 14*.
Blake, et al.: "Duplicating and Verifying LogTM with OS Support in the M5 Simulator", WDDD'07 Jun. 9-13, 2007, San Diego, California, USA, Jun. 13, 2007, pp. 1-9, XP55280241, Retrieved from the Internet: URL:http://citeseerx.st.psu.edu/viewdocjdownload?doi=10.1.1.649.3032&rep1&type=pdf [retrived on Jun. 14, 2016] * abstract* *p. 1, right-hand column, line 27—p. 2, left-hand column, line 16* * Section 2.4; p. 4-p.5*.
European Patent Office, Supplementary European Search Report mailed Jun. 28, 2016 in European Patent Application No. 10841429. 3.

* cited by examiner

HANDLING OPERATING SYSTEM (OS) TRANSITIONS IN AN UNBOUNDED TRANSACTIONAL MEMORY (UTM) MODE

This application is a continuation of U.S. patent application Ser. No. 12/638,064, filed Dec. 15, 2009, the content of which is hereby incorporated by reference.

BACKGROUND

An unbounded transactional memory (UTM) enables arbitrarily large transactions in time and memory footprint to occur through a combination of hardware acceleration using hardware and software. Running and implementing UTM transactions typically require specially compiled code for implementing concurrency control mechanisms with UTM hardware acceleration interfaces. As a result, UTM transactions may not operate correctly if the execution of the UTM compiled code is intervened by a user-level asynchronous event and subsequent execution of user runtime code that is not compiled for the UTM execution.

One of the main causes of user-level asynchronous events is handling of a hardware exception at a user-level exception (or signal) handler. An exception is an event that occurs during program execution that requires execution of a special code path, called the exception handler, outside the normal execution flow of control. Hardware exception conditions are detected by hardware and reported to an operating system (OS). Examples of hardware exceptions include a divide-by-zero operation or an attempt to access an invalid memory address location. On occurrence of such an exception, control typically passes from user-level code to the OS. When the OS receives control to process such exception events, it typically attempts to dispatch the exception to a proper exception handler associated with the program that raised the exception.

When a hardware exception is detected and raised from the user mode program, the OS typically collects exception information, transfers it to a user stack, and transitions back to the user mode, and dispatches the exception to a user mode exception handler. In many modern operating systems such as WINDOWS, UNIX and LINUX OS's, default user-level runtime code, which is not compiled for UTM execution, is provided to handle a dispatch request for a user mode exception (signal) from the operating system. Therefore, a UTM application and its runtime system face a serious technical challenge for dealing with exception handling and asynchronous invocation of the user-level exception dispatch and handling code during a UTM transaction.

For example, one of the main causes of asynchronous execution of the OS user runtime code is servicing an exception dispatch request from the OS kernel code to support signal programming (e.g., signals in UNIX operating systems) and user-level exception handling (e.g., SEH in WINDOWS operating systems). This user mode service routine for receiving a request from the OS kernel and dispatching an exception to the target exception handler is part of the default user runtime system provided by the operating system. Existing OS kernel code and OS user runtime code are not part of the UTM runtime system and have limited or no knowledge about UTM implementation schemes and various UTM hardware operation modes.

As a result, asynchronous dispatch to the OS user runtime code and subsequent execution of the OS user runtime during a UTM transaction may result in yielding incorrect operations and results. One simple solution is to always cause an abort of a pending transaction upon a hardware exception during UTM execution and allow the UTM runtime system to restart the transaction in a software transactional memory (STM) mode with no UTM hardware acceleration. However, this solution leads to a significant performance slow down for a UTM thread, particularly when the program involves frequent exception handlings such as floating point exception filtering. Thus a UTM thread suffers from expensive abort and restart operations and UTM hardware acceleration cannot be realized for certain transaction code execution.

DETAILED DESCRIPTION

Figure 1:
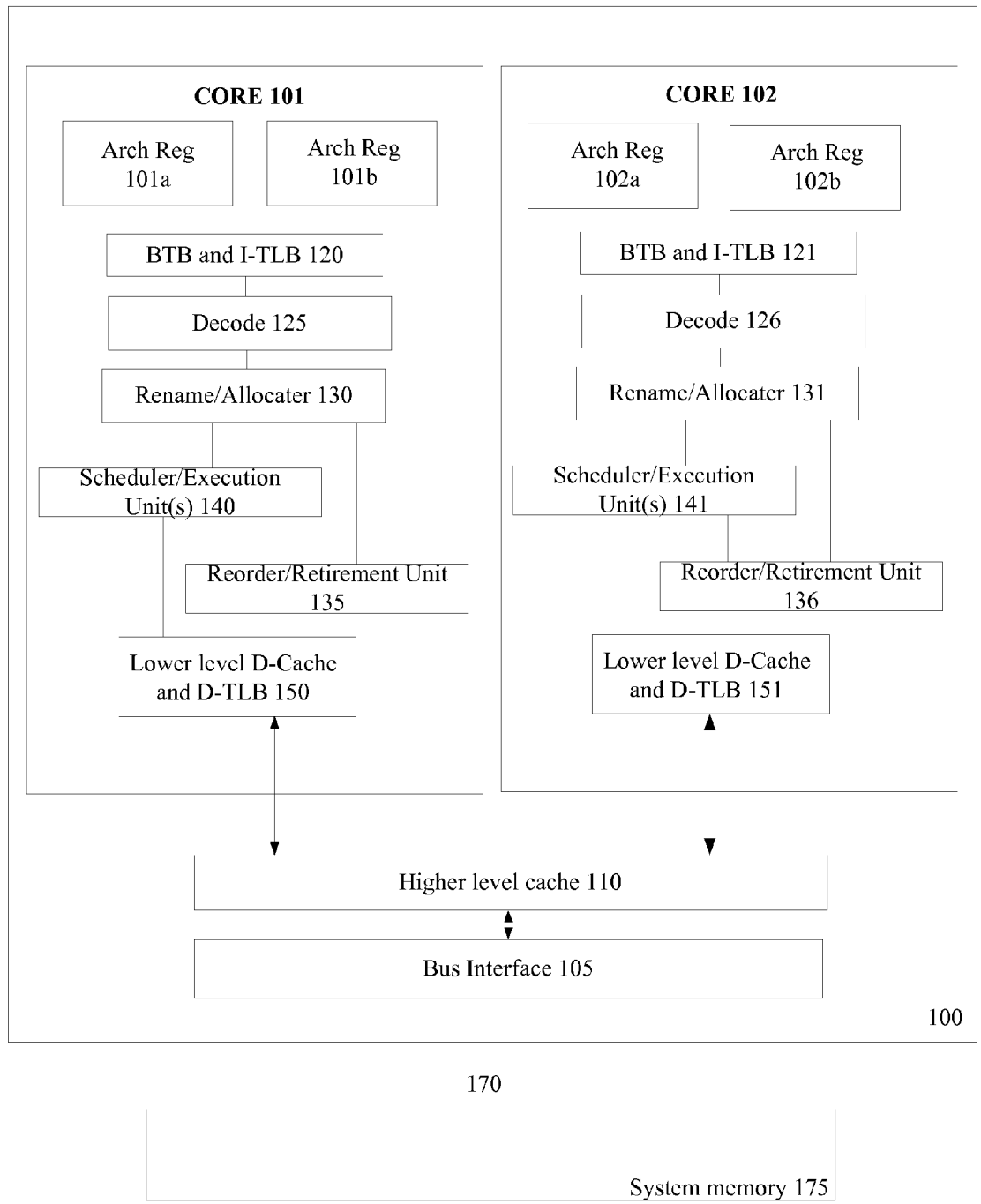
FIG. 1 is a block diagram of a processor in accordance with one embodiment of the present invention.

In various embodiments, a combination of hardware support in a processor and code associated with an unbounded transaction memory (UTM) runtime system, UTM user-level code, and operating system (OS) code may enable improved handling of UTM transactions. Specifically, embodiments may enable improved handling of exceptions, interrupts and so forth that may occur during a UTM transaction. In this way, the work undertaken for the UTM transaction may be maintained without a need to automatically abort the transaction upon an exception or other transfer of control from the UTM transaction. As will be discussed further below, different mechanisms to handle such transitions may be provided. In general these mechanisms may enable suspension of a transaction upon an exit from a UTM thread executing in a user mode to a kernel mode and UTM-aware handling in the kernel mode, such that on return to the user-level UTM thread, it may be possible to resume the transaction without necessarily aborting the transaction.

While the scope of the present invention is not limited in this regard, embodiments may be implemented in a system that provides hardware support for UTM operations. A background of such hardware support is now provided to introduce concepts and terminology used. However, it is to be understood that the scope of the present invention is not limited to such hardware and instead embodiments can be implemented in any UTM system.

As used herein, a "thread" may refer to a hardware thread (e.g., a logical processor which includes a state storage in a processor). An "agent" is a thread or other system resource that makes coherent memory accesses. In turn, memory can be logically divided into monitoring blocks (MBLKs). For each MBLK, each thread has a private set of monitors, namely a read monitor (RM) and a write monitor (WM) that software can read and write. RM and WM are orthogonal and together encode three different MBLK monitor modes: unmonitored (RM=0,WM=0) in which the MBLK is not monitored for accesses by other agents; read monitored (RM=1,WM=0) in which the MBLK is monitored for writes by other agents and for monitor loss; and write monitored ((RM=0,WM=1) and (RM=1,WM=1)) in which the MBLK is monitored for accesses by other agents and for monitor loss.

A monitor loss occurs when a MBLK's monitors spontaneously reset to the unmonitored state. A transition from a monitored mode to an unmonitored mode generates a monitor loss event. A conflicting access may occur when one agent accesses a MBLK that another agent has write monitored, or when one agent writes a MBLK that another agent has read monitored. A monitor conflict occurs when another agent performs a conflicting access to a MBLK that a thread has monitored, and causes the monitor mode of the MBLK to be reset to unmonitored. A monitor conflict generates both a monitor conflict event and a monitor loss event. A monitored access is an access that either tests monitoring prior to instruction execution, or sets monitoring as part of execution. An unmonitored access is an access that neither modifies nor tests monitoring (in other words, behavior is identical to typical instruction set architecture (ISA) semantics for memory accesses).

Memory can also be logically divided into buffering blocks (BBLKs). For each BBLK, each thread has a private instance of a buffering property (BUF). Visible (BUF=0) means all writes to the BBLK's memory range are globally observed. Buffered (BUF=1) means all writes to the BBLK's memory range are locally observed by the thread that issued the writes, but are not globally observed by other agents. Software may set the buffered property for specific BBLKs, or reset the buffered property for all BBLKs. Two different actions can cause the buffered property to transition from 1 to 0. A BBLK-discard discards any writes to the BBLK's memory by the local thread since the buffered properties last transitioned from 0 to 1, and a BBLK-commit irrevocably makes such writes globally observable. A buffering loss event occurs when any buffered property of any thread spontaneously resets to 0, performing a BBLK-discard. In addition, write monitor loss implies buffering loss. On a given thread, upon write monitor loss for a MBLK, all BBLKs within the MBLK address range incur buffering loss.

Memory can also be logically divided into sets of metadata blocks (MDBLKs) of various sizes and for various usage contexts. MDBLKs, or more specifically, MDBLK[CR][MDID]s, can be parameterized by a compression ratio (CR) and by a metadata context ID (MDID). For each MDBLK[CR][MDID], each thread has a private instance of a metadata property (META).

For a given CR, there can be any number of distinct MDIDs each designating a unique instance of metadata. The metadata for a given CR and MDID is distinct from the metadata for any other CR or MDID. A given implementation may support multiple concurrent contexts, where the number of contexts will depend on the CR and certain configuration information related to the specific system of which the processor is a part. In one embodiment, for uncompressed metadata, there can be a quadword (QWORD) of metadata for each QWORD of physical data. Metadata is interpreted by software only. Software may set, reset, or test META for a specific MDBLK[CR][MDID], or reset META for all the thread's MDBLK[*][*]'s, or reset META for all the thread's MDBLKs[CR][MDID] that may intersect a given MBLK(addr). Any META property of the thread may spontaneously reset to 0, generating a metadata loss event.

A monitoring range is a specified range of virtual addresses identified by a base and extent which correspond to a single virtual memory page. When this facility is enabled, any memory with an address in the range read by the thread is given the range read monitored property. Similarly, any memory with an address in the range written by the thread is given the range write monitored property. These properties may be spontaneously removed by the hardware. If another agent writes to the memory location, then both properties are removed. If another thread reads a location that has the range write monitored property, then that property is removed. Whenever a range monitoring property is removed, a loss range monitoring event is generated. Thus in general, hardware acceleration of UTM transactions can be realized using the monitoring, buffering, and metadata properties.

A UTM event is an event that may be captured by the UTM hardware and that may subsequently cause the UTM hardware to trigger an ejection that is to invoke a UTM event handler. An ejection is an asynchronous transfer of control to an ejection target instruction pointer (IP) location specified by an application-level transaction ejection IP (TEJEC-TIP) register of a processor. Each thread may have an associated UTM event handler entry point within the ejection handler. Note that an ejection handler is the code provided at the instruction pointer (IP) location specified by TEJECTIP register. A UTM event handler associated with that thread may be called by the ejection handler. The UTM runtime system may configure the TEJECTIP register to directly point to the UTM event handler or create a table to contain its pointer so that the ejection handler can call to the UBT event handler by looking up this table, depending on the implementation of the UTM runtime system. In response to specific events, certain status register event tracking bits may be set; and in response to that, control may transfer to the handler. Note that in various embodiments, this transfer does not involve a change of privilege level, although the interpretation of certain operations may be modified when executing within the handler. Control can be returned to the mainline of the UTM application by a user-level control transfer instruction and the execution in the UTM application may be resumed at some defined resuming point of the program.

An asynchronous UTM event is an event not attributable to any specific instruction executed by the thread. Asynchronous events may be related to changes in the monitoring, buffering, and metadata properties associated with the thread. These changes may be triggered by the action of other agents or spontaneously by the hardware. Example asynchronous events include monitor loss events, read monitor loss, write monitor loss, monitor conflict events, read monitor conflict, write monitor conflict, buffering loss event, metadata loss event, and range monitoring loss event.

A synchronous event is a fault that disrupts the normal flow of instruction execution such that the current instruction did not retire, and a synchronous UTM event (Synch-Event) is an event occurring as a side-effect of executing (but not necessarily retiring) a specific and known instruction in the thread.

In one embodiment, a read-write transaction control register (TCR) may be present, which is a control register associated with a thread and may include a plurality of indicators (e.g., bits) that can control UTM operation, including when an event causes handler invocation. An event invokes the handler only if its status is set in a transaction status register (TSR), which is a status register associated with a thread and may include a plurality of indicators, and its corresponding event handler enable is set in the TCR. Event statuses may continue to accumulate in the TSR regardless of whether the corresponding handler enable is set. Bits of the TCR may also control whether the specific synchronous event is eligible to be captured in TSR, and whether the handler may be invoked on the corresponding synchronous event status in TSR. In general, the TCR may include enable indicators to enable a handler for a corresponding event, such as loss events or other events occurring during a transaction.

In turn, the TSR provides UTM status information, including the accumulation of recent UTM event types. As examples, the TSR may include a plurality of indicators each to indicate presence of an event such as a loss event occurring during a transaction, in addition to status indicators as to whether various UTM properties are in use during a transaction. This register continuously accumulates all asynchronous UTM events, plus eligible synchronous TM events. In one embodiment, reading the TSR into a general purpose register (GPR) can provide a snapshot of any events (asynchronous or synchronous) accumulated at that instant. In addition to synchronous and asynchronous UTM events, embodiments may provide for software-defined UTM events, which can be injected through writing a value to a corresponding indicator or field of the TSR. In such embodiments, one or more fields of a TSR can be reserved for software-defined events. When non-zero values are written to the software event fields in the TSR, the hardware treats these updates the same as UTM hardware events, and may trigger an ejection. When ejection is not suspended, having non-zero values in the software event fields in the TSR may result in a spontaneous transfer of control to the ejection handler specified by the TEJECTIP register. The ejection handler, which is provided by the UTM runtime system, may inspect the values in the TSR to find the cause(s) of the ejection.

As further background, it is instructive to look at example hardware that can be used for UTM transactions in accordance with an embodiment of the present invention. Referring to FIG. 1, an embodiment of a processor capable of executing multiple threads concurrently is illustrated. Note, processor 100 may include hardware support for hardware transactional execution. Either in conjunction with hardware transactional execution, or separately, processor 100 may also provide hardware support for hardware acceleration of a STM, separate execution of a STM, or a combination thereof, e.g., UTM in accordance with an embodiment of the present invention. Processor 100 may be any type of processor, such as a micro-processor, an embedded processor, a digital signal processor (DSP), a network processor, or other device to execute code. Processor 100, as illustrated, includes a plurality of processing elements.

Physical processor 100, as illustrated in FIG. 1, includes two cores, core 101 and 102, which share access to higher level cache 110. Although processor 100 may include asymmetric cores, i.e., cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e., four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. The architecture state registers may, in one embodiment, include registers for use in implementing UTM transaction, e.g., a TSR, TCR, and a TEJECTIP register. Other smaller resources, such as instruction pointers and renaming logic in rename allocator logic 130 may also be replicated for threads 101a and 101b. Some resources, such as reorder buffers in reorder/retirement unit 135, instruction translation lookaside buffer (ITLB) 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

As illustrated, processor 100 includes bus interface module 105 to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched elements from higher-level cache 110. Note that higher-level or further out refers to cache levels increasing or getting further way from the execution unit(s). In one embodiment, higher-level cache 110 is a second-level data cache. However, higher level cache 110 is not so limited, as it may be associated with or include an instruction cache. A trace cache, i.e., a type of instruction cache, may instead be coupled after decoder 125 to store recently decoded traces. Module 120 also potentially includes a branch target buffer to predict branches to be executed/taken and a ITLB to store address translation entries for instructions.

Decode module 125 is coupled to fetch unit 120 to decode fetched elements. In one embodiment, processor 100 is associated with an ISA, which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

In one embodiment, processor 100 is capable of hardware transactional execution, software transactional execution, or a combination or hybrid thereof. A transaction, which may also be referred to as a critical or atomic section of code, includes a grouping of instructions, operations, or micro-operations to be executed as an atomic group. For example, instructions or operations may be used to demarcate a transaction or a critical section. In one embodiment, these instructions are part of a set of instructions, such as an ISA, which are recognizable by hardware of processor 100, such as decoders described above. Often, these instructions, once compiled from a high-level language to hardware recognizable assembly language include operation codes (opcodes), or other portions of the instructions, that decoders recognize during a decode stage.

Typically, during execution of a transaction, updates to memory are not made globally visible until the transaction is committed. As an example, a transactional write to a location is potentially visible to a local thread, yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible.

However, if the transaction is invalidated during its pendency, the transaction is aborted and potentially restarted without making the updates globally visible. As a result, pendency of a transaction, as used herein, refers to a transaction that has begun execution and has not been committed or aborted, i.e., pending.

In one embodiment, processor 100 is capable of executing transactions utilizing hardware/logic, i.e., within a Hardware Transactional Memory (HTM) system. Numerous specific implementation details exist both from an architectural and microarchitectural perspective when implementing an HTM; most of which are not discussed herein to avoid unnecessarily obscuring embodiments of the invention. However, some structures and implementations are disclosed for illustrative purposes. Yet, it should be noted that these structures and implementations are not required and may be augmented and/or replaced with other structures having different implementation details.

In general, processor 100 may be capable of executing transactions within a UTM system, which attempts to take advantage of the benefits of both STM and HTM systems. For example, an HTM is often fast and efficient for executing small transactions, because it does not rely on software to perform all of the access tracking, conflict detection, validation, and commit for transactions. However, HTMs are usually only able to handle smaller transactions, while STMs are able to handle unbounded sized transactions. Therefore, in one embodiment, a UTM system utilizes hardware to execute smaller transactions and software to execute transactions that are too big for the hardware. As can be seen from the discussion below, even when software is handling transactions, hardware may be utilized to assist and accelerate the software. The same hardware may also be utilized to support and accelerate a pure STM system.

As stated above, transactions include transactional memory accesses to data items both by local processing elements within processor 100, as well as potentially by other processing elements. Without safety mechanisms in a transactional memory system, some of these accesses would potentially result in invalid data and execution, i.e., a write to data invalidating a read, or a read of invalid data. As a result, processor 100 may include logic to track or monitor memory accesses to and from data items for identification of potential conflicts, such as read monitors and write monitors, as discussed below.

In one embodiment, processor 100 includes monitors to detect or track accesses, and potential subsequent conflicts, associated with data items. As one example, hardware of processor 100 includes read monitors and write monitors to track loads and stores, which are determined to be monitored, accordingly. As an example, hardware read monitors and write monitors are to monitor data items at a granularity of the data items despite the granularity of underlying storage structures. In one embodiment, a data item is bounded by tracking mechanisms associated at the granularity of the storage structures to ensure that at least the entire data item is monitored appropriately.

As a specific illustrative example, read and write monitors include attributes associated with cache locations, such as locations within lower level data cache 150, to monitor loads from and stores to addresses associated with those locations. Here, a read attribute for a cache location of data cache 150 is set upon a read event to an address associated with the cache location to monitor for potential conflicting writes to the same address. In this case, write attributes operate in a similar manner for write events to monitor for potential conflicting reads and writes to the same address. To further this example, hardware is capable of detecting conflicts based on snoops for reads and writes to cache locations with read and/or write attributes set to indicate the cache locations are monitored, accordingly. Inversely, setting read and write monitors, or updating a cache location to a buffered state, in one embodiment, results in snoops, such as read requests or read for ownership requests, which allow for conflicts with addresses monitored in other caches to be detected.

Therefore, based on the design, different combinations of cache coherency requests and monitored coherency states of cache lines result in potential conflicts, such as a cache line holding a data item in a shared read monitored state and a snoop indicating a write request to the data item. Inversely, a cache line holding a data item being in a buffered write state and an external snoop indicating a read request to the data item may be considered potentially conflicting. In one embodiment, to detect such combinations of access requests and attribute states snoop logic is coupled to conflict detection/reporting logic, such as monitors and/or logic for conflict detection/reporting, as well as status registers to report the conflicts.

However, any combination of conditions and scenarios may be considered invalidating for a transaction, which may be defined by an instruction, such as a commit instruction. Examples of factors that may be considered for non-commit of a transaction include detecting a conflict to a transactionally accessed memory location, losing monitor information, losing buffered data, losing metadata associated with a transactionally accessed data item, and detecting an other invalidating event, such as an interrupt, ring transition, or an explicit user instruction (assuming that a resumed transaction cannot be continued).

In one embodiment, hardware of processor 100 is to hold transactional updates in a buffered manner. As stated above, transactional writes are not made globally visible until commit of a transaction. However, a local software thread associated with the transactional writes is capable of accessing the transactional updates for subsequent transactional accesses. As a first example, a separate buffer structure is provided in processor 100 to hold the buffered updates, which is capable of providing the updates to the local thread and not to other external threads. Yet, the inclusion of a separate buffer structure is potentially expensive and complex.

In contrast, as another example, a cache memory, such as data cache 150, is utilized to buffer the updates, while providing the same transactional functionality. Here, cache 150 is capable of holding data items in a buffered coherency state; in one case, a new buffered coherency state is added to a cache coherency protocol, such as a Modified Exclusive Shared Invalid (MESI) protocol to form a MESIB protocol. In response to local requests for a buffered data item, namely a data item being held in a buffered coherency state, cache 150 provides the data item to the local processing element to ensure internal transactional sequential ordering. However, in response to external access requests, a miss response is provided to ensure the transactionally updated data item is not made globally visible until commit. Furthermore, when a line of cache 150 is held in a buffered coherency state and selected for eviction, the buffered update is not written back to higher level cache memories—the buffered update is not to be proliferated through the memory system, i.e., not made globally visible, until after commit. Upon commit, the buffered lines are transitioned to a modified state to make the data item globally visible.

Note that the terms internal and external are often relative to a perspective of a thread associated with execution of a transaction or processing elements that share a cache. For example, a first processing element for executing a software thread associated with execution of a transaction is referred to a local thread. Therefore, in the discussion above, if a store to or load from an address previously written by the first thread, which results in a cache line for the address being held in a buffered coherency state, is received, then the buffered version of the cache line is provided to the first thread since it is the local thread. In contrast, a second thread may be executing on another processing element within the same processor, but is not associated with execution of the transaction responsible for the cache line being held in the buffered state—an external thread; therefore, a load or store from the second thread to the address misses the buffered version of the cache line, and normal cache replacement is utilized to retrieve the unbuffered version of the cache line from higher level memory.

Here, the internal/local and external/remote threads are being executed on the same processor, and in some embodiments, may be executed on separate processing elements within the same core of a processor sharing access to the cache. However, the use of these terms is not so limited. As stated above, local may refer to multiple threads sharing access to a cache, instead of being specific to a single thread associated with execution of the transaction, while external or remote may refer to threads not sharing access to the cache.

As stated above in the initial reference to FIG. 1, the architecture of processor 100 is purely illustrative for purpose of discussion. For example, in other embodiments UBT hardware can be implemented for a processor with a much simpler in-order execution processor design, which may not include complex rename/allocator and reorder/retirement units. Similarly, the specific examples of translating data addresses for referencing metadata is also exemplary, as any method of associating data with metadata in separate entries of the same memory may be utilized.

Figure 2:
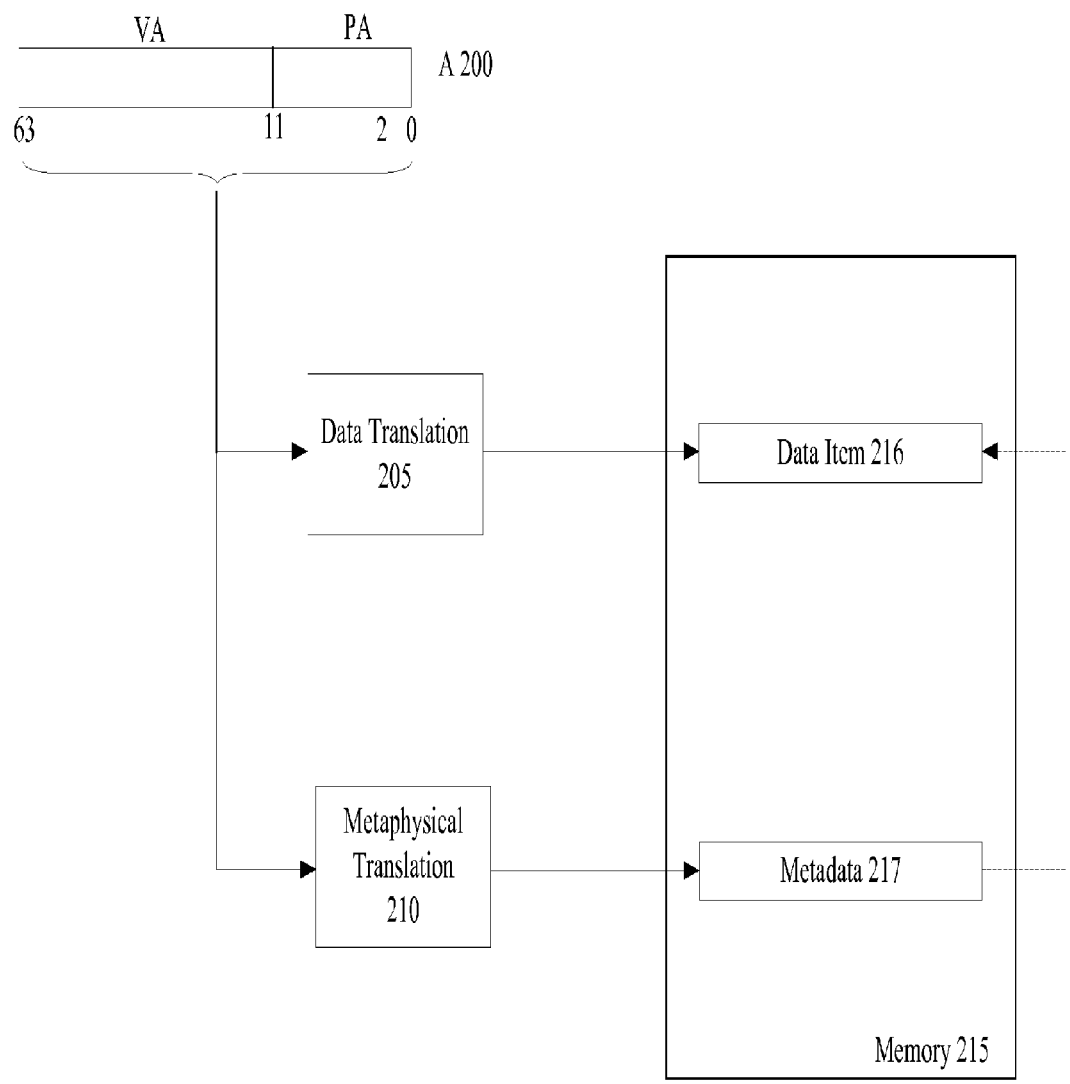
FIG. 2 is a block diagram of holding metadata for a data item in a processor in accordance with one embodiment of the present invention.

Turning to FIG. 2, an embodiment of holding metadata for a data item in a processor is illustrated. As depicted, metadata 217 for data item 216 is held locally in memory 215. Metadata includes any property or attribute associated with data item 216, such as transactional information relating to data item 216. Some illustrative examples of metadata are included below; yet the disclosed examples of metadata are purely illustrative. As such, metadata location 217 may hold any combination of information and other attributes for data item 216.

As a first example, metadata 217 includes a reference to a backup or buffer location for transactionally written data item 216, if data item 216 has been previously accessed, buffered and/or backed up within a transaction. Here, in some implementations a backup copy of a previous version of data item 216 is held in a different location, and as a result, metadata 217 includes an address, or other reference, to the backup location. Alternatively, metadata 217 itself may act as a backup or buffer location for data item 216.

As another example, metadata 217 includes a filter value to accelerate repeat transactional accesses to data item 216. Often, during execution of a transaction utilizing software, access barriers are performed at transactional memory accesses to ensure consistency and data validity. For example, before a transactional load operation a read barrier is executed to perform read barrier operations, such testing if data item 216 is unlocked, determining if a current read set of the transaction is still valid, updating a filter value, and logging of version values in the read set for the transaction to enable later validation. However, if a read of that location has already been performed during execution of the transaction, then the same read barrier operations are potentially unnecessary.

As a result, one solution includes utilizing a read filter to hold a first default value to indicate data item 216, or the address therefore, has not been read during execution of the transaction and a second accessed value to indicate that data item 216, or the address therefore, has already been accessed during a pendency of the transaction. Essentially, the second accessed value indicates whether the read barrier should be accelerated. In this instance, if a transactional load operation is received and the read filter value in metadata location 217 indicates that data item 216 has already been read, then, in one embodiment, the read barrier is elided—not executed—to accelerate the transactional execution by not performing unnecessary, redundant read barrier operations. Note that a write filter value may operate in the same manner with regard to write operations. However, individual filter values are purely illustrative, as, in one embodiment, a single filter value is utilized to indicate if an address has already been accessed—whether written or read. Here, metadata access operations to check metadata 217 for 216 for both loads and stores utilize the single filter value, which is in contrast to the examples above where metadata 217 includes a separate read filter value and write filter value. As a specific illustrative embodiment, four bits of metadata 217 are allocated to a read filter to indicate if a read barrier is to be accelerated in regards to an associated data item, a write filter to indicate if a write barrier is to be accelerated in regards to an associated data item, an undo filter to indicate undo operations are to be accelerated, and a miscellaneous filter to be utilized in any manner by software as a filter value.

A few other examples of metadata include an indication of, representation of, or a reference to an address for a handler—either generic or specific to a transaction associated with data item 216, an irrevocable/obstinate nature of a transaction associated with data item 216, a loss of data item 216, a loss of monitoring information for data item 216, a conflict being detected for data item 216, an address of a read set or read entry within a read set associated with data item 216, a previous logged version for data item 216, a current version of data item 216, a lock for allowing access to data item 216, a version value for data item 216, a transaction descriptor for the transaction associated with data item 216, and other known transaction related descriptive information. Furthermore, as described above, use of metadata is not limited to transactional information. As a corollary, metadata 217 may also include information, properties, attributes, or states associated with data item 216, which are not involved with a transaction.

Figure 3:
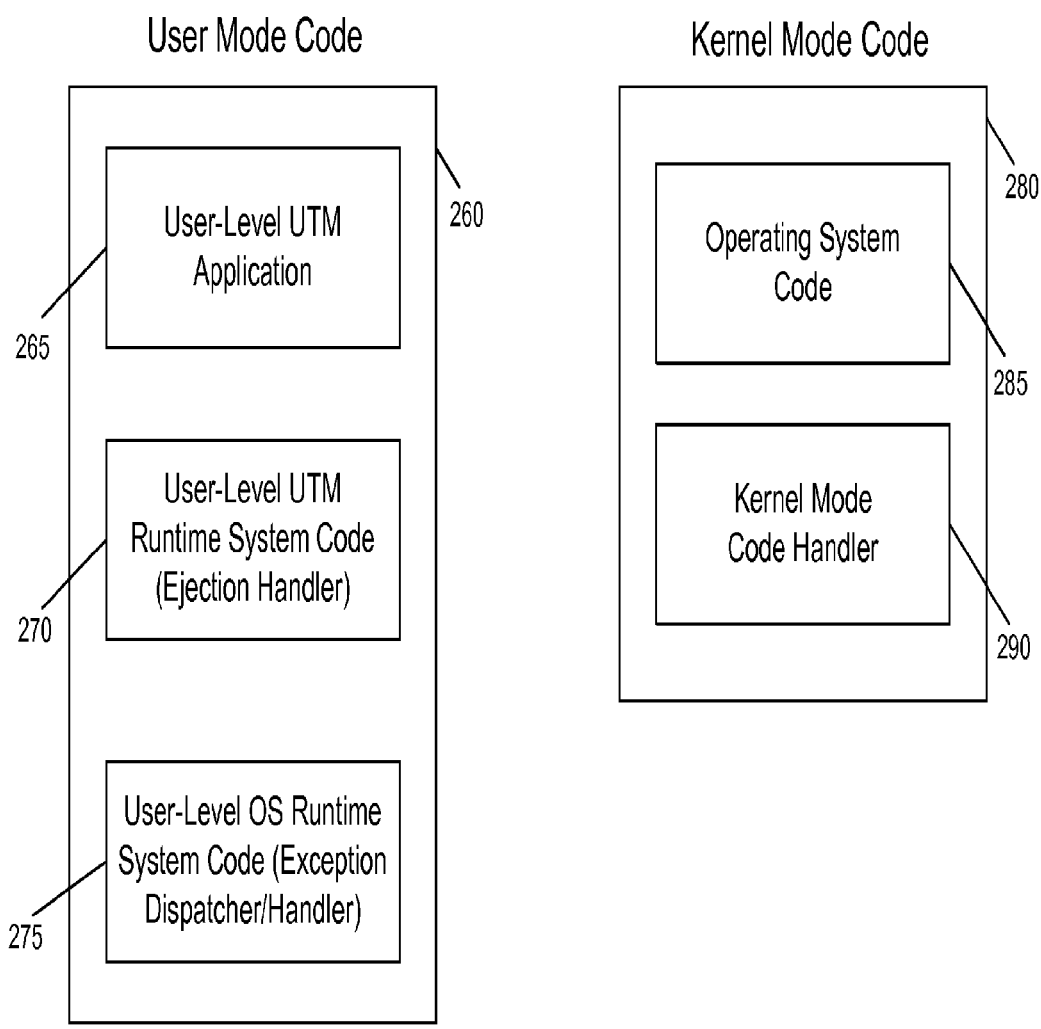
FIG. 3 is a block diagram of a software architecture in accordance with an embodiment of the present invention.

In addition to this hardware review, a review of the arrangement of a software organization is also instructive. Referring now to FIG. 3, shown is a block diagram of a software architecture in accordance with an embodiment of the present invention. As shown in FIG. 3, architecture 250 includes both user mode code 260 and kernel mode code 280. In general, user mode code can be code associated with various applications to be executed on the underlying hardware, in addition to runtime system code, which can be associated with particular applications as well as the OS. In general, kernel mode code can be thought of as the OS code itself and kernel mode exception handling code.

In implementations for UTM operations, user mode code 260 includes one or more UTM applications 265. To handle certain events that may occur during execution of this code, user mode code may further include user-level UTM runtime system code 270 that may be a collection of software libraries to support UTM applications/environment and may handle various exceptions or other events occurring during UTM operations. In the example shown in FIG. 3, such code may include an ejection handler. To handle more generic operations or events that may occur, either during a UTM application or another user mode application, user-level OS runtime system code 275 may also be a collection of software libraries to support user-mode applications/environment. As will be discussed further below, such code may be able to handle control flow for at least some exceptional events occurring during UTM operations.

Referring to OS code 280, in addition to the normal OS code 285 for booting up and handling various abstractions for the underlying architecture (e.g., memory accesses and so forth), the OS code may include a kernel mode exception handler 290. In various embodiments, this kernel mode code may be UTM-aware such that based on knowledge of a given UTM mode and environment, as well as an event which caused a transition to the kernel mode, the exception handler may direct control flow to an appropriate location in the user mode, e.g., a user runtime system exception dispatcher handler, a UTM user runtime exception dispatcher (if present) and/or an ejection handler. While shown with this particular implementation in the embodiment of FIG. 3, the scope of the present invention is not limited in this regard.

With this background discussion of relevant hardware, software, and exception handling operations when an exception occurs during a UTM transaction can now be considered. When an exception is encountered in a user-level UTM thread, a transition occurs to the kernel mode. Since the OS may need to first attempt to solve the exception such as when it is a page fault (#PF), the OS code may run upon a hardware exception before deciding on communicating this exception event through software-defined UTM events to the UTM runtime system. There may also be additional advantages in running the OS code upon a hardware exception and allowing the OS code to decide whether to generate the UTM software event. For example, in OS and runtime implementations that support the UTM, it is possible for the OS to support the user runtime environment (including the exception handler dispatch support) with multiple execution paths (e.g., one for non-UTM code and another for the UTM environment). This allows the OS to select an appropriate user-level exception dispatcher code depending on the state of the interrupted user thread, and the use of the software-defined events may not be necessary.

The software-defined events essentially allow the UTM runtime system code to intercept specific asynchronous events such as hardware exceptions through the ejection target handler. Such events allow the UTM runtime system to implement a specific policy for handling exceptions occurring in the middle of transactional execution such as falling back to a STM scheme, re-starting a transaction and handling the exception through default user runtime exception dispatch flows.

Figure 4:
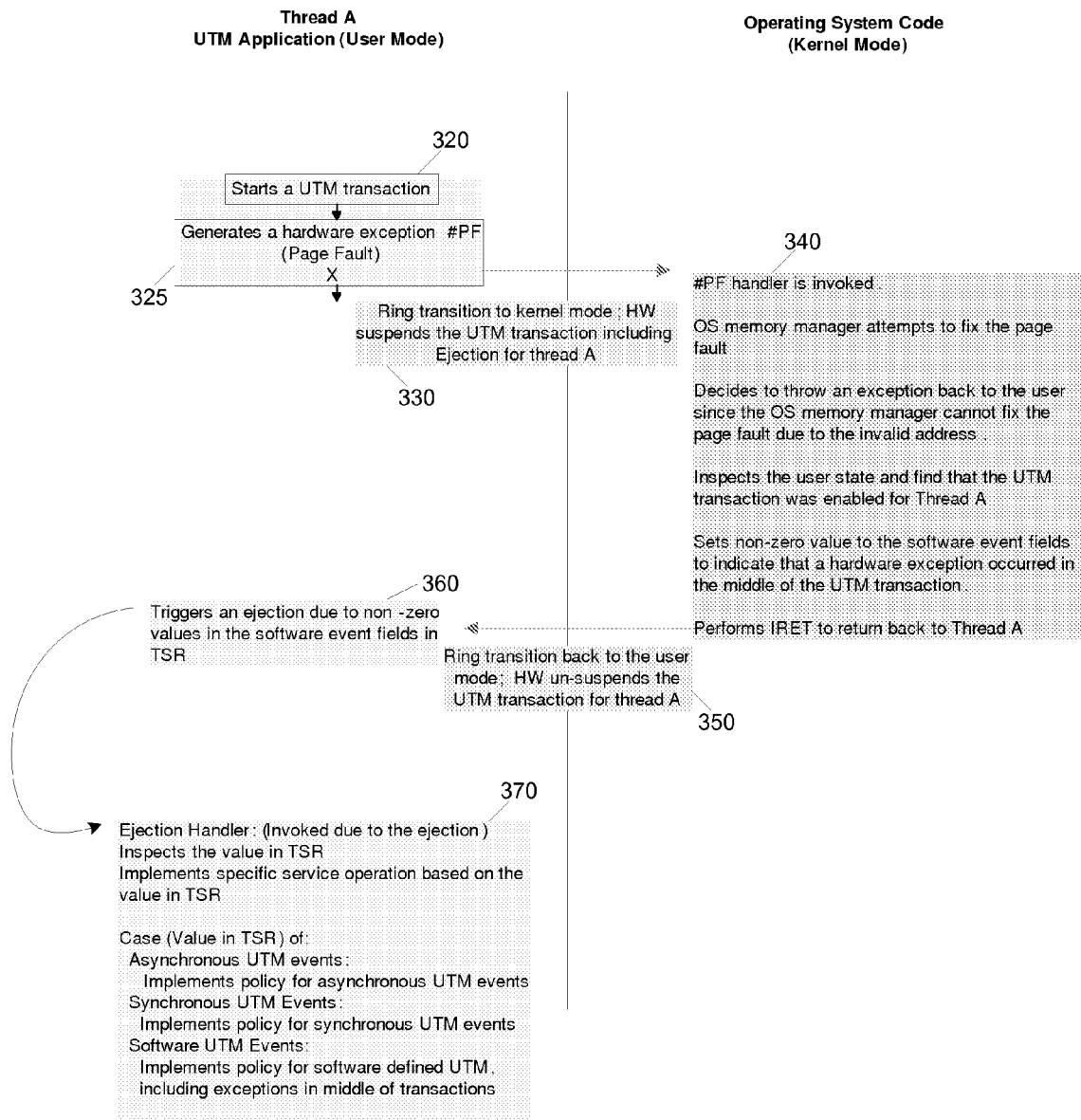
FIG. 4 is a flow diagram of a method of delivering an asynchronous software defined (UTM) event in accordance with one embodiment of the present invention.

As shown in FIG. 4, method 300 may be used to perform UTM transactions in a user thread, namely a thread A, which may be of a UTM application that executes in user mode. The UTM transaction can begin by setting up values for different properties of the UTM and beginning execution of the transaction (block 320). During execution of the UTM transaction, a hardware exception may be generated (block 325). For example, a page fault may occur.

Accordingly as seen in FIG. 4, a ring transition to kernel mode may occur (block 330). This ring transition may cause the hardware to suspend the UTM transaction. Such suspension may include suspending an ejection mechanism for the user thread. In one embodiment, suspension may be realized by setting one or more indicators (e.g., bits) of the TSR and/or TCR. In suspension, other activities such as implicit read-monitoring and implicit buffering may be also suspended. Thus default memory read and write behaviors no longer create monitor and buffer UTM properties. Accordingly, control passes to OS code that is executing in kernel mode (block 340). Because of the page fault exception, the OS exception handler may direct control to a page fault handler which may be invoked. In execution of this handler, an OS memory manager may attempt to fix the page fault. If this is unsuccessful, the OS may throw the exception back to the user mode, e.g., due to an invalid address. Prior to sending the exception back to user mode, the OS exception handler may inspect the user state that is present, including the transaction status register. Because a UTM transaction was in process at the time of the ring transition, analysis of this TSR indicates that the UTM transaction was pending for thread A. Accordingly, the OS may set a non-zero value to one or more software event fields of the TSR to indicate that a hardware exception occurred during the UTM transaction. Finally, the OS executes an interrupt return instruction (IRET) to return control back to thread A.

This ring transition (block 350) back to the user mode causes the hardware to un-suspend the UTM transaction, e.g., by setting one or more indicators in the TSR and/or TCR. When the UTM transaction is resumed (block 360), an ejection may be triggered due to the non-zero value present in one or more software event fields of the TSR. Accordingly, while in the user mode, control passes to an ejection handler (block 370). The ejection handler may include code to inspect the value in the TSR and implement a specific service operation based on the software event fields present in the TSR. Specifically, the ejection handler may include multiple code paths, each for a particular type of UTM event. Based on the values present in the TSR, one of these paths may be executed. As examples, different paths may be present to handle asynchronous UTM events, synchronous UTM events, and software UTM events, although the scope of the present invention is not limited in this regard. Each such path may include code to implement a policy for handling the given type of event. While shown with this particular implementation in the embodiment of FIG. 4, the scope of the present invention is not limited in this regard.

Even though a hardware implementation for identifying the occurrence of UTM software events is described above, software emulation of the same concept may be performed. To realize emulation, instead of setting a non-zero value to one or more software event fields in the TSR, an OS exception handler can manually change a return IP address to the UTM service handler and pass the information of the reasons for invocation of the exception through a memory parameter defined in software conventions.

Embodiments may also provide hardware support and OS algorithm enhancements to optimally support signal and exception handling occurring in the course of UTM transaction execution. Thus, the OS and its default runtime system can implement exception dispatch flows to the UTM program.

In different embodiments, hardware mechanisms may suspend the UTM operation modes while the processor is operating in the kernel ring 0 OS code. This allows the OS kernel code, which may (or may not) be compiled for operating with the UTM hardware operation modes, to execute and operate correctly without being impacted by the UTM hardware operation mode configured by the user UTM thread. Mechanisms may suspend the UTM transaction without causing abort and dynamically track loss of UTM properties and record and accumulate such loss event information while the processor is operating at ring 0. In this way, the user UTM thread can resume and continue the UTM transaction without abort if there is no UTM property loss recorded during the OS kernel code execution. This mechanism also allows UTM property loss events that occurred during the kernel mode operations to be handled later when the OS kernel code returns back to execution of the user thread.

The UTM runtime system and UTM compiler use a variety of UTM modes and operations provided by UTM hardware and implement UTM transaction execution strategies. Each UTM hardware operation mode uses specific code paths generated to run the UTM transaction code correctly in order to handle specific UTM property loss events through in-lined operations or out-of-line asynchronous handler invocation (e.g., an ejection handler) supported by the UTM architecture. As a result, multiple code paths may be present for the same program flow, each corresponding to the code path for a specific UTM mode of operation. UTM hardware provides a variety of UTM hardware operation modes that enable the UTM runtime system and UTM compiler to implement UTM transaction execution strategy. As described above, the UTM hardware provides UTM properties including monitoring, buffering and metadata to implement a variety of sophisticated algorithms including a wide spectrum of transactional memory designs. Such hardware may also provide concepts of UTM events and ejection (or other user-level asynchronous control transfer) mechanisms to allow the UTM runtime to implement software strategies for handling loss events on specific UTM properties.

Kernel mode OS exception handling code may thus take into account the current UTM transaction mode by inspecting the TCR and/or TSR, and based on this information, make a final decision of whether it should resume from the point that generated the exception, whether it should throw an exception to the default OS user mode runtime code, or whether it should pass control to the ejection handler.

Figure 5:
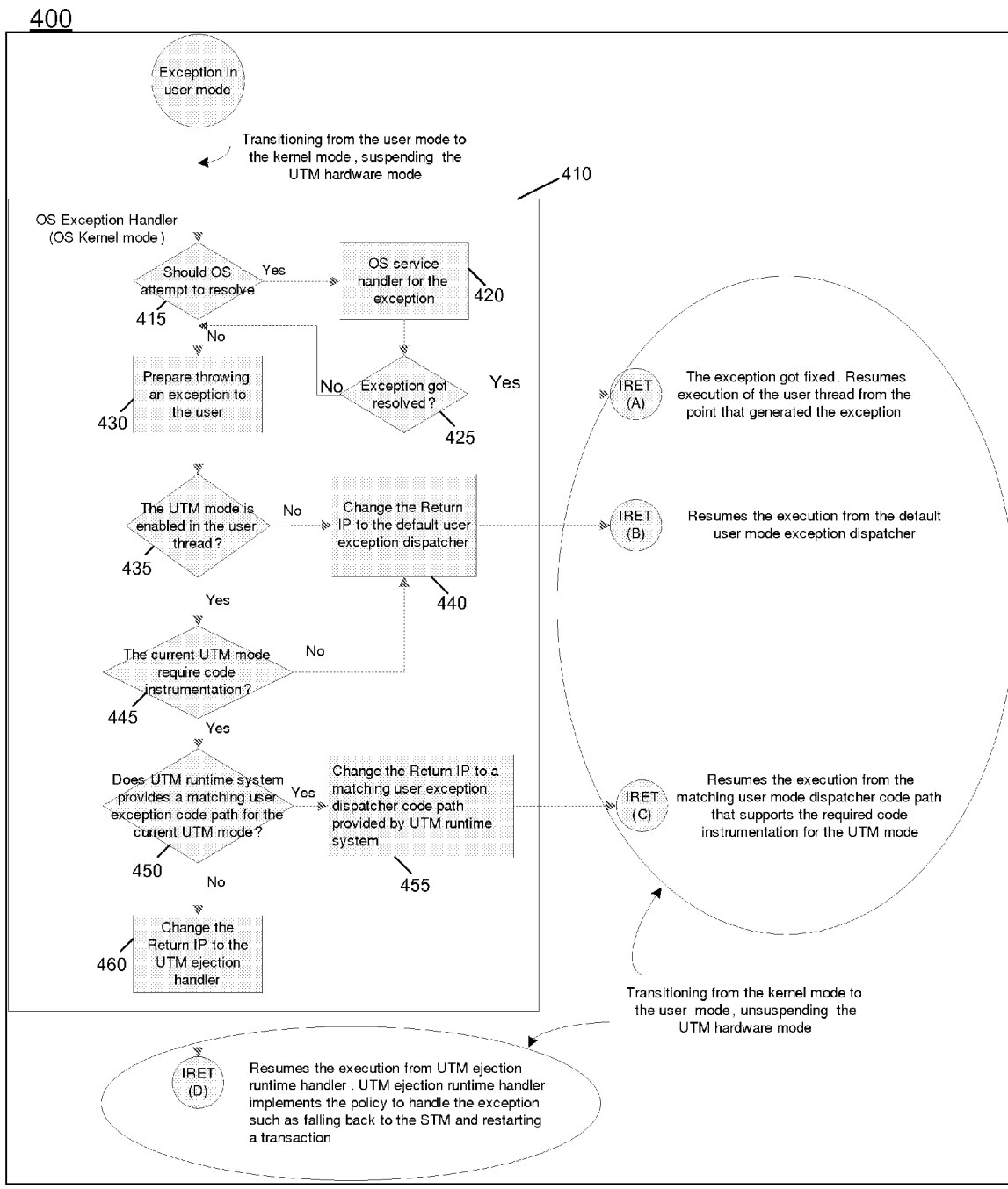
FIG. 5 is a flow diagram for handling an exception or other transition of control to an operating system (OS) during a UTM transaction in accordance with one embodiment of the present invention.

Referring now to FIG. 5, shown is a flow diagram of an overall sequence of events for handling an exception or other transition of control to an OS during a UTM transaction. As seen in FIG. 5, when an exception occurs in user mode, the transaction is suspended and control passes to kernel mode, and more particularly to OS exception handling code of a kernel mode exception handler 410. For example, hardware exception conditions (e.g., divide-by-zero) are detected by hardware and reported to the OS kernel code. Handler 410 may intercept the exception and collect exception information. As seen, exception handler 410 may determine whether the OS should attempt to resolve the event that caused the exception (diamond 415). If the OS determines to handle the exception, control passes to block 420, where an OS service handler for the given type of exception may be executed to attempt to resolve the problem. Accordingly, it may be determined at diamond 425 if the exception was resolved. If so, control may pass back to the user mode. Specifically, the kernel may execute an interrupt return instruction (IRET) to resume from the IP location, which corresponds to the point of the user thread at which the exception was generated.

Referring still to FIG. 5, if the exception handler chooses not to allow the OS to attempt to handle the exception or the exception was not fixed, control passes to block 430, where the exception may be prepared to be thrown back to the user mode. This preparation may include identifying the type of execution and collecting processor states at the time of exception to generate exception information. Accordingly, control passes to diamond 435 where it may be determined whether, at the time of the transition, the UTM mode was enabled in the user thread. If not, control passes to block 440 where the return IP address may be updated to a default user exception dispatcher. Accordingly, control passes back to a user mode at this address (IRET(B)). During this process, in one embodiment the OS collects exception information and transfers it to the user stack, transitions to the user mode, and dispatches the exception to a user mode exception dispatch handler.

In an implementation in which the OS handler does not have further knowledge of the UTM system, this return to user mode may be for UTM transactions as well. However, in implementations in which the OS handler is UTM-aware, optionally the kernel mode code may support multiple user mode exception dispatch paths provided from the UTM runtime system. These multiple code paths can each correspond to a different UTM implementation scheme with specific UTM hardware operation modes. The dispatch code paths may handle a request from the OS kernel to dispatch an exception to the target handler, but has special code instrumentations to operate correctly with the UTM hardware operation modes used by the UTM implementation scheme, as now discussed.

Thus if it is determined that a UTM transaction mode was enabled at the time of the exception, control passes to diamond 445, where it may be determined whether the current UTM mode requires code instrumentation. That is, the exception handler may determine, based on its knowledge of the current UTM mode and the type of exception whether special handler code is needed to handled the indicated exception. Thus the kernel mode code may further examine the current UTM hardware transaction mode by inspecting the TCR and/or TSR to determine if it is safe to pass control to the OS user runtime code. If so, the user mode exception dispatch code in the OS user runtime handles a request from the OS kernel to dispatch an exception to the target handler. This supports the language level exception constructs in the application program execution environment. If not, control passes to block 440 discussed above.

If instead special handler code is indicated, control passes to diamond 450 where it may be determined whether the UTM runtime system provides a code path for the current UTM mode. This determination can be based at least in part on analysis of a lookup table available to the OS that may indicate the available UTM modes, possible exceptions, and whether a special code path exists in UTM runtime system for handling the given exception. In one embodiment, the table may include a plurality of entries each having a UTM mode, exception type, and corresponding code path. Based on the combination of UTM mode and exception type, a code path of the entry may be selected. If the determination of diamond 450 is in the affirmative, control passes to block 455, where the return IP address may be changed to a location corresponding to a user exception dispatcher code path provided by the UTM runtime system. Accordingly, control passes back to the user mode at return address C (IRET(C)).

Otherwise, if no special UTM runtime code path is available, control passes to block 460, where the return IP may be updated to correspond to a location of the UTM ejection handler (block 460). Accordingly, control passes back to the user mode (more particularly via IRET(D)). In various embodiments, as will be discussed further, the UTM ejection handler may implement a policy to handle an exception such as falling back to a STM mode and restarting a transaction. While shown with this particular implementation the embodiment of FIG. 5 the scope of the present invention is not limited this regard.

Figure 6:
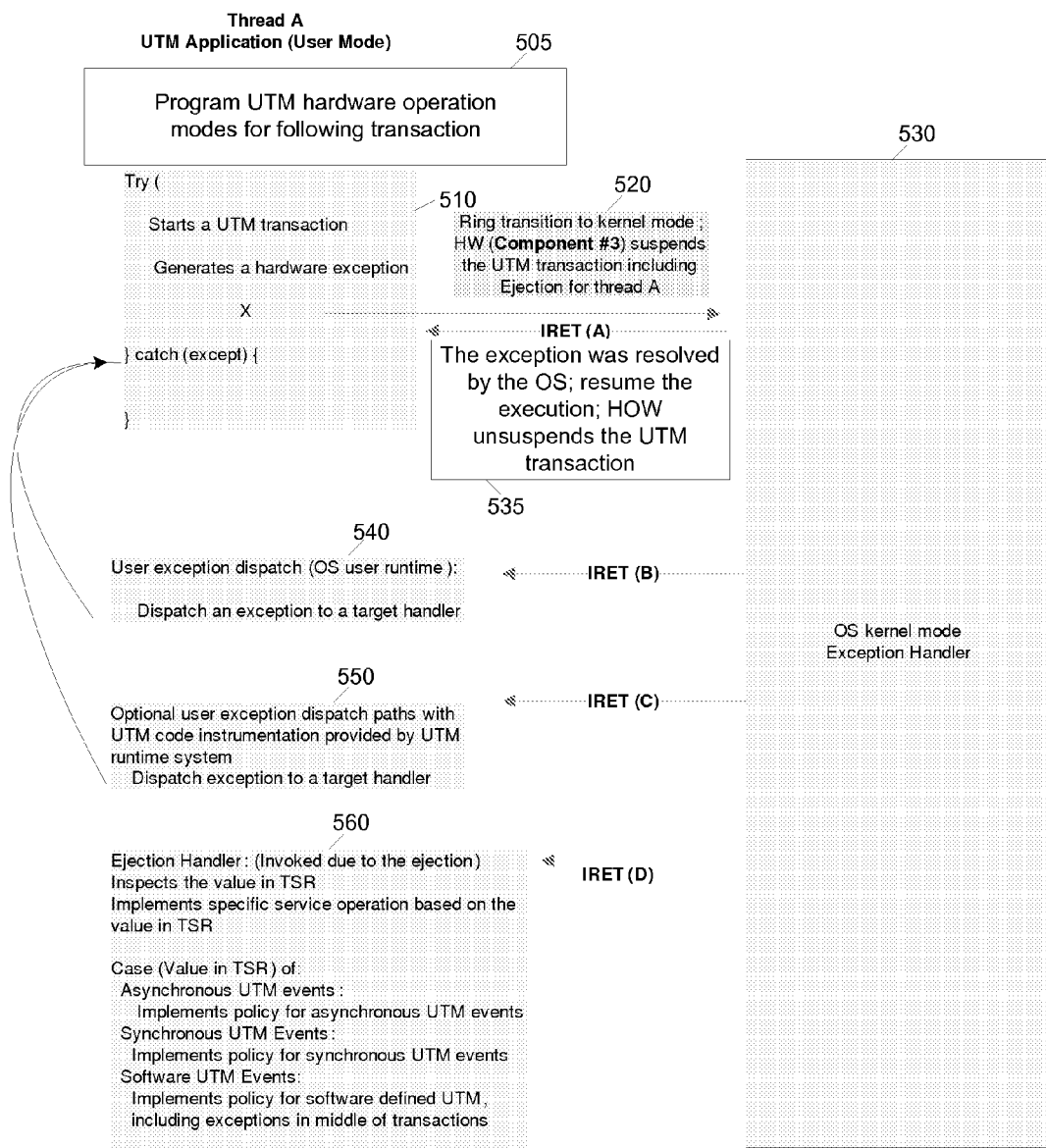
FIG. 6 is a flow diagram for executing UTM transaction code and UTM runtime system code in a user thread in accordance with one embodiment of the present invention.

While FIG. 5 primarily shows the flow of operations from the OS exception handler point of view, FIG. 6 shows a further flow of operations in executing a UTM transaction in a user thread and incurring an exception to the OS. In general, a UTM transaction may execute in user mode by use of a UTM runtime system, along with UTM code instrumentation. The UTM transaction may begin by programming a selected hardware operation mode (block 505) and beginning execution of the transaction (block 510). Such modes may implement one of a variety of UTM implementation schemes. Examples of UTM implementation schemes include: cache resident TM (CRTM) where a transaction fits in the cache; hardware accelerated STM (HASTM) where a transaction does not fit in the cache but can use hardware for filtering and monitoring; aggressive hardware accelerated TM (HATM) where only reads or writes that fit in the cache are performed and which use hardware for filtering and monitoring; and a STM, where a transaction does not use hardware and instead only uses software schemes for implementing the transaction.

Still referring to FIG. 6, during execution of the transaction, an exception may occur (block 510). This exception may be any type of exception, but for purposes of discussion assume that the exception is a hardware exception. Accordingly, control passes to block 520, where a ring transition to the kernel mode occurs. Prior to the transition, hardware may suspend the UTM transaction, including an ejection mechanism for the user thread. Control then passes to kernel mode, and more particularly to an exception handler of the kernel mode (block 530).

As discussed above with regard to FIG. 5, the exception handler may or may not resolve the exception. If the handler does resolve the exception, control passes back to the main block (510) of the UTM transaction for continued execution of the transaction. During the return ring transition (block 535), the hardware may un-suspend the UTM transaction. Since no property of the UTM transaction was modified or cleared, the transaction is free to continue operation at its return point.

If instead the exception handler 530 is unable to resolve the exception, a different return path to the user mode can be provided, such as discussed above regarding FIG. 5. As seen, control can be passed to a user exception dispatcher associated with an OS user runtime (block 540). Instead, in implementations in which the OS exception handler is UTM-aware, a return may be to a user exception dispatch path provided by the UTM runtime system (block 550). In yet other implementations of a UTM-aware exception handler, instead of passing control to a UTM user exception dispatch path, control may instead be passed to an ejection handler 560. Thus as seen, depending on a type of OS exception handler, in addition to a type of UTM mode, exception type and availability of different execution paths in the UTM runtime system, control may pass back from exception handling to one of many different code paths within a user mode.

As hardware exceptions and external interrupts may be unavoidable during the arbitrarily large transactions of UTM (in time and memory footprint), embodiments may thus enable the operating system to attempt to fix the hardware exception such as page faults without causing a very expensive abort operation to the UTM transaction. At the same time, the operating system can provide support of the exception handling programming to the application in case the hardware exception cannot be fixed by the operating system, e.g., by delivering software-defined UTM events to the UTM runtime system. Similarly, embodiments may enable the operating system to handle external interrupts without causing a very expensive abort operation to the UTM transaction, and allow the operating system to provide support of signal programming (e.g., UNIX signals) for applications by allowing the operating system to communicate a signal incident to the UTM runtime system during the UTM transaction through software-defined UTM events.

As discussed above in various embodiments, a UTM architecture may provide for hardware properties such as monitoring, buffering and metadata. These features provide software the means to implement a variety of sophisticated algorithms, including a wide spectrum of transactional memory designs. Each property can be implemented in hardware by either extending existing cache protocols of a cache memory or allocating dedicated hardware resources.

Since these UTM properties may be handled and managed as private properties to a thread, embodiments may enable OS context switch code to support these properties.

Unlike hardware register states that have a relatively small fixed small amount of resources, the size of buffering, monitoring and metadata properties for a UTM thread are dynamic, can vary and may become substantially larger than the register states. Thus, a traditional strategy of a context switch operation, where the OS saves and restores a fixed amount of hardware register resources, may no longer work or become prohibitively expensive if it attempts to do so for these dynamic and potentially very large-sized UTM properties.

To avoid unconditional aborts of a UTM transaction and discarding of such hardware resources upon OS events including external interrupts, page faults and OS system calls, embodiments provide mechanisms to effectively manage the large amount of UTM properties upon an OS context switch. In different embodiments, hardware support may suspend the transaction during kernel operation and continue tracking loss of monitoring, buffering and metadata events. Also, with hardware and OS support, buffering and monitoring may be explicitly cleared and metadata discarded for the thread, and appropriate buffering and monitoring losses events may be generated when resuming the thread execution after the context switch. Then, hardware and UTM runtime support can be used to recover from the buffering, monitoring and metadata losses. Hardware and software mechanisms may be provided for handling loss of UTM properties and may include transfer of control to a pre-specified IP address in the UTM runtime code if loss events occurred.

Instead of saving and restoring UTM properties upon a context switch, the hardware may provide a mechanism for dynamically tracking loss of monitoring, buffering and metadata properties and recording and accumulating such UTM property loss event information. An instance of a hardware implementation for recording these events may be the TSR, which may have bit fields to reflect loss events that have occurred. Multiple bit fields can be provided, where each loss event bit corresponds to a loss event of a different UTM property. A loss event bit in the status register can be set on UTM property loss event and cannot be cleared until an explicit clear operation is performed by software. Reading of this status register provides a snapshot of any UTM events accumulated at that instant.

In some embodiments, the loss of UTM properties can be handled through an asynchronous control transfer to a specified runtime address or explicit polling of the status register by UTM software. In order for the operating system code to safely perform a context switch operation without having unexpected asynchronous control transfer operation, it is assumed that the suspension mechanism of the asynchronous control transfer operation is provided while the code is operating in the kernel mode. In one embodiment, an ejection mechanism enables asynchronous control transfer to the TEJECTIP location upon UTM loss event detection.

Prior to performing a thread switch to a new thread, the operating system code performs clear operations of the UTM properties. All loss events incurred by this operation are reflected to the status register. In one embodiment, this operation can be provided by a combination of certain user-level instructions, e.g., a transaction clear (TCA) instruction (clear buffering and monitoring with accumulate) and a clear metadata (CLMD) instruction (clear all metadata). The loss events incurred by these operations can be reflected to corresponding indicators (e.g., status bits) in the TSR register.

When the operating system code resumes the execution of a UTM thread upon return from the kernel mode to the user mode, execution of recovery policy code, which can be UTM runtime specific, can be triggered with a special control transfer mechanism to a UTM runtime code. Alternatively, the operating system code may explicitly change the return IP address of the user thread to point to special user runtime code that handles loss of the UTM properties. This alternative UTM runtime transfer mechanism upon return from the kernel after a context switch may be implemented when an asynchronous transfer hardware mechanism is not available and software is instead responsible for manually polling the TSR register to find loss events and taking necessary actions upon checkpoint.

Embodiments thus provide mechanisms to effectively manage the large amount of per-thread hardware transactional state (e.g., UTM properties) and thus enable hardware acceleration of UTM.

Figure 7:
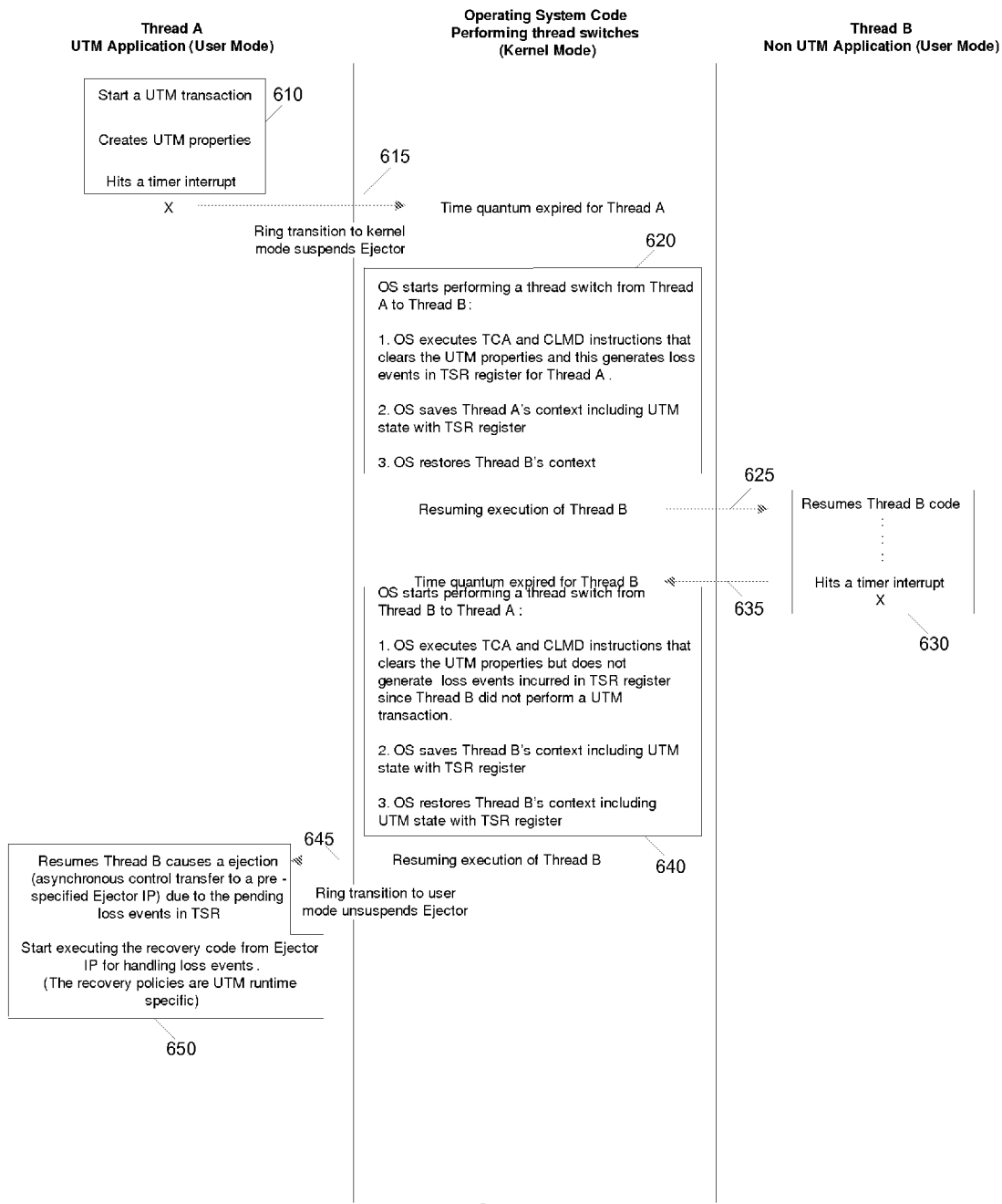
FIG. 7 is a flow diagram of a method for handling context switch operations in accordance with an embodiment of the present invention.

Referring now to FIG. 7, shown is a flow diagram of a method for handling context switch operations in accordance with an embodiment of the present invention. As shown in FIG. 7, method 600 illustrates the various operations performed both in a user mode such as different threads executing in user mode namely a first thread (i.e., thread A) that is executing a UTM application and a second thread (i.e., thread B) that is executing a non-UTM application. In addition, a kernel mode is present that performs OS operations including handling of a thread switch between these modes. As seen in FIG. 7, method 600 may begin by execution of the UTM application in the first thread (block 610). This UTM transaction may begin and various UTM properties such as buffering monitoring and metadata may be created for the transaction. During the course of the transaction, a timer interrupt may occur. Accordingly, a ring transition 615 occurs which passes control to the kernel mode. However, instead of aborting the transaction, the transaction can be suspended, e.g., by setting various one or more indicators in a TSR, including suspending execution of an ejection handler.

Accordingly, control passes to the kernel mode where the OS performs activities for handling the context switch (block 620). Such activities may include execution of certain user-level or other instructions to clear the UTM properties. In addition, indicators for these operations may be set in the TSR (e.g., loss of property indicators). The OS may then save the first thread's context. This context may include the UTM state including the TSR register. To enable the context switch, the OS further restores the context of the second thread to the machine state. Accordingly, control passes to the second thread for execution of its application (blocks 625 and 630). Accordingly, this thread may continue, e.g., until it hits a timer or other interrupt, which again causes a ring transition back to the kernel mode (block 635). Now, the OS performs operations to enable the context switch back to the first thread (block 640). These operations may mirror those discussed above with regard to block 620. However, note that upon clearing the UTM properties, because no such properties were set in the second thread as the second thread was executing a non-UTM application, no loss of event indicators are updated for the TSR associated with the second thread.

Still referring to FIG. 7, at block 645, another ring transition occurs to return control back to thread A. At block 650, thread A may resume execution. In one embodiment, this resumed execution may include a jump to the ejection handler, as the TSR associated with this thread indicates the lost event. Accordingly, the ejector may execute recovery code for handling the lost event. While the scope of the present invention is not limited in this regard, such recovery code may include restarting of the transaction, execution in another UTM mode or so forth. While shown with this particular implementation in the embodiment of FIG. 7, the scope of the present invention is not limited in this regard.

Figure 8:
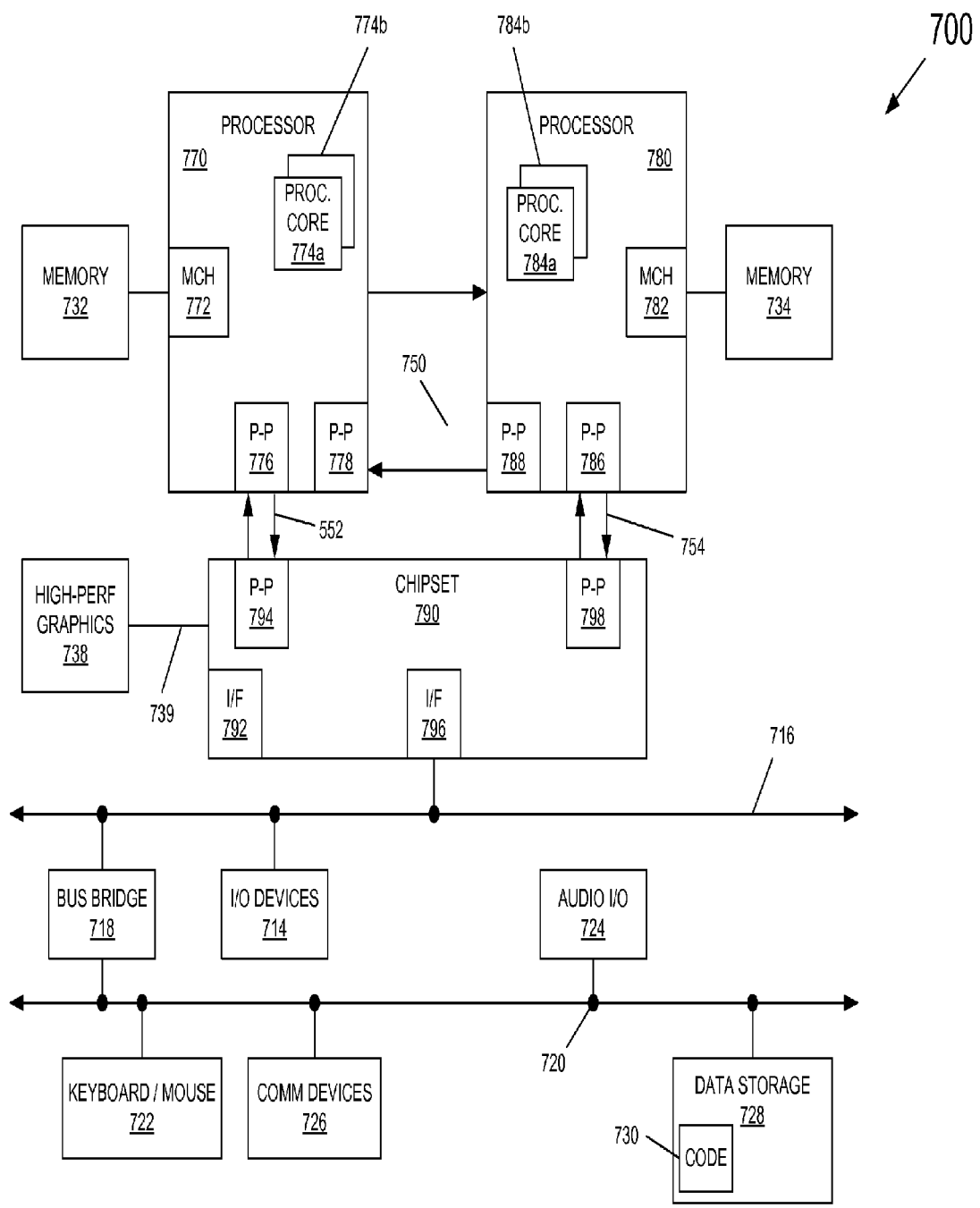
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 700 is a point-to-point interconnect system, and includes a first processor 770 and a second processor 780 coupled via a point-to-point interconnect 750. As shown in FIG. 8, each of processors 770 and 780 may be multicore processors, including first and second processor cores (i.e., processor cores 574a and 774b and processor cores 784a and 784b), although potentially many more cores may be present in the processors. The processor cores may execute various UTM threads and may be able to maintain a transaction after a transition in control to a kernel mode, potentially avoiding the need to abort the transaction.

Still referring to FIG. 8, first processor 770 further includes a memory controller hub (MCH) 572 and point-to-point (P-P) interfaces 776 and 778. Similarly, second processor 780 includes a MCH 782 and P-P interfaces 786 and 788. As shown in FIG. 8, MCH's 772 and 782 couple the processors to respective memories, namely a memory 732 and a memory 734, which may be portions of main memory (e.g., a dynamic random access memory (DRAM)) locally attached to the respective processors. First processor 770 and second processor 780 may be coupled to a chipset 790 via P-P interconnects 752 and 754, respectively. As shown in FIG. 8, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 8, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a processor including a plurality of cores, each core including at least one transaction register, wherein at least one core of the plurality of cores is to execute an unbounded transactional memory (UTM) transaction in a first user thread, wherein when an event is incurred during execution of the UTM transaction that causes a transition from the first user thread to a kernel mode, the at least one core is to maintain the UTM transaction after the transition to the kernel mode, suspend but not abort the UTM transaction before the transition to the kernel mode, update at least one status field of the at least one transaction register in an exception handler of the kernel mode, and thereafter execute one of a plurality of code paths in the user mode based on execution of the exception handler.

2. The apparatus of claim 1, wherein the processor is to receive control in the first user thread via a transition from the exception handler of the kernel mode and continue execution of the UTM transaction in the first user thread.

3. The apparatus of claim 1, wherein the plurality of code paths includes a user mode exception dispatcher of a user operating system (OS) runtime system, a user mode exception dispatcher of a UTM runtime system, and an ejection handler of the UTM runtime system.

4. The apparatus of claim 3, wherein the processor is to perform one of a plurality of recovery code paths in the ejection handler based on the updated state of the at least one status field of the at least one transaction register.

5. The system of claim 1, wherein the at least one core comprises a transaction control register (TCR) having a plurality of indicators each to control an aspect the UTM transaction.

6. The system of claim 1, wherein the at least one transaction register comprises a transaction status register having a plurality of indicators each to indicate a status of the UTM transaction.

7. At least one non-transitory computer readable storage medium comprising instructions that when executed enable a system to:
   receive control in a kernel mode via a ring transition from a first user thread during execution of an unbounded transactional memory (UTM) transaction in the first user thread;
   clear at least one UTM property of the UTM transaction, update a state of at least one event field of a transaction status register (TSR) associated with the first user thread to indicate the clear, and store the TSR with a context of the first user thread; and
   restore the first user thread context including the TSR to a processor and transition from the kernel mode to the first user thread.

8. The at least one non-transitory computer readable medium of claim 7, further comprising instructions that when executed enable the first user thread to maintain the UTM transaction when control is transitioned to the kernel mode.

9. The at least one non-transitory computer readable medium of claim 7, further comprising instructions that when executed enable the system to execute an ejection handler in the first user thread responsive to the updated state of the at least one event field of the TSR after the transition from the kernel mode to the first user thread.

10. The at least one non-transitory computer readable medium of claim 9, further comprising instructions that when executed enable the system to perform one of a plurality of recovery code paths in the ejection handler based on the updated state of the at least one event field of the TSR.

11. The at least one non-transitory computer readable medium of claim 9, further comprising instructions that when executed enable the system to suspend the UTM transaction and the ejection handler before transitioning from the first user thread to the kernel mode, the suspending including updating at least one status indicator of the TSR and updating a control indicator of a transaction control register (TCR) associated with the first user thread.

12. The at least one non-transitory computer readable medium of claim 7, further comprising instructions that when executed enable the system to perform a first context switch from the first user thread to a second user thread and a second context switch from the second user thread back to the first user thread.

13. The at least one non-transitory computer readable medium of claim 12, further comprising instructions that when executed enable the system to receive control in the kernel mode via a ring transition from the second user thread during execution of an application in the second user thread, and while in the kernel mode, clear at least one UTM property of a UTM transaction, and not update a state of the TSR associated with the second user thread if the second user thread did not execute a UTM transaction.

14. A method comprising:
executing an unbounded transactional memory (UTM) transaction in a first user thread of a user mode of a system;
incurring an event during execution of the UTM transaction that causes a transition from the first user thread to a kernel mode, the event comprising an exception;
suspending but not aborting the UTM transaction before transitioning to the kernel mode;
updating at least one status field of at least one transaction register of a processor associated with the first user thread in an exception handler of the kernel mode; and
thereafter executing one of a plurality of code paths in the user mode based on execution of the exception handler.

15. The method of claim 14, further comprising receiving control in the first user thread via a transition from the exception handler of the kernel mode and continuing execution of the UTM transaction in the first user thread.

16. The method of claim 14, wherein the plurality of code paths includes a user mode exception dispatcher of a user operating system (OS) runtime system, a user mode exception dispatcher of a UTM runtime system, and an ejection handler of the UTM runtime system.

17. The method of claim 16, further comprising performing one of a plurality of recovery code paths in the ejection handler based on the updated state of the at least one status field of the at least one transaction register.

* * * * *